United States Patent

Hoekje et al.

[15] 3,642,442
[45] Feb. 15, 1972

[54] PROCESS FOR PREPARING PIGMENTARY METAL OXIDE

[72] Inventors: Howard H. Hoekje, Akron; Franklin Strain; William L. Wilson, both of Barberton, all of Ohio

[73] Assignee: PPG Industries, Inc., Pittsburgh, Pa.

[22] Filed: Mar. 25, 1964

[21] Appl. No.: 354,597

[52] U.S. Cl. ................................23/202 V, 23/1, 23/21, 23/139, 23/140, 23/142, 23/144, 23/148
[51] Int. Cl. ................C01g 23/04, C01b 33/18, C01g 1/02
[58] Field of Search..............23/202, 1, 21, 139, 140, 142, 23/144, 148, 182, 186, 183, 201; 106/300

[56] References Cited

UNITED STATES PATENTS

| | | |
|---|---|---|
| 2,635,946 | 4/1953 | Weber et al. ............23/202 V X |
| 3,120,427 | 2/1964 | Mas et al. .................23/202 V |
| 2,616,842 | 11/1952 | Sheer et al. ...................204/164 |
| 2,731,410 | 1/1956 | Weir..............................204/164 |
| 2,921,892 | 1/1960 | Casey............................23/202 X |
| 2,960,726 | 11/1960 | Sheer et al. ...............204/164 X |
| 3,090,745 | 5/1963 | Berghaus ....................204/164 X |
| 3,275,411 | 9/1966 | Freeman........................23/202 |

OTHER PUBLICATIONS

Hellund book. "The Plasma State"1961 Ed. pp 25, 34–35, 65, 80, 81, 89, 95 & 100. Reinhold Pub. Corp., N.Y. Copy in Sci. Lib. QC 718H4C.2.

*Primary Examiner*—Edward Stern
*Attorney*—Chisholm and Spencer

[57] ABSTRACT

Metal oxides, such as titanium dioxide, are prepared by vapor phase oxidation of corresponding metal halides in a reaction zone supplied with heat energy from a gaseous stream heated by electrical energy. A gaseous plasma is generated by passing said gaseous stream through a discharge being conducted between electrodes and providing in path of said gaseous plasma a further electrode containing a white oxide forming metallic element for nucleation of the oxidation reaction.

12 Claims, 3 Drawing Figures

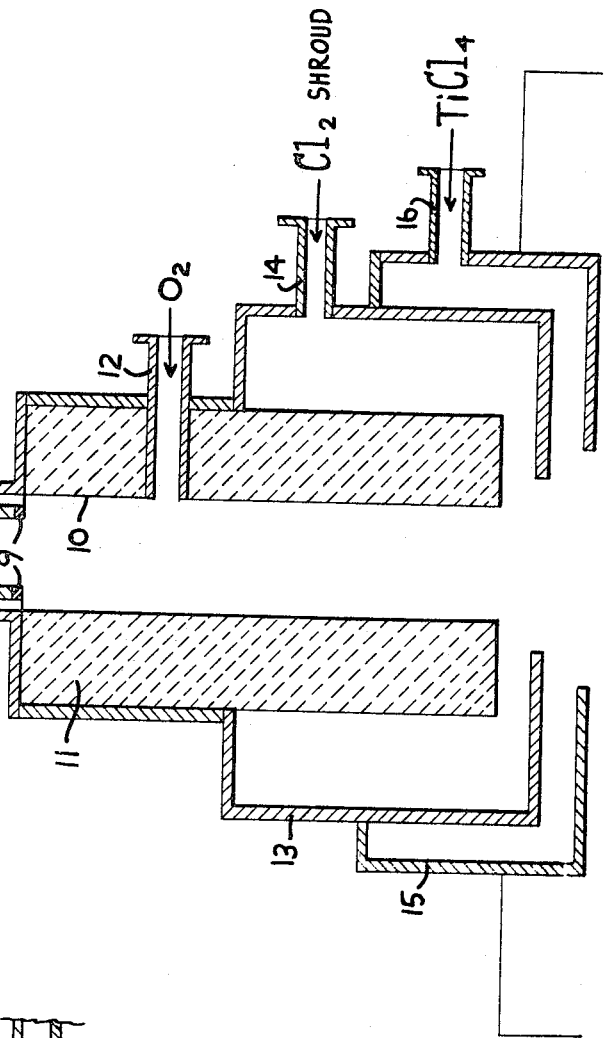
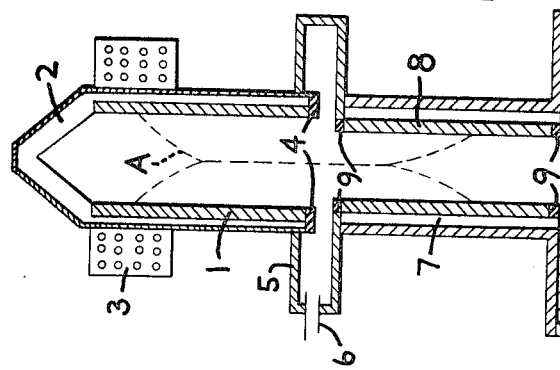
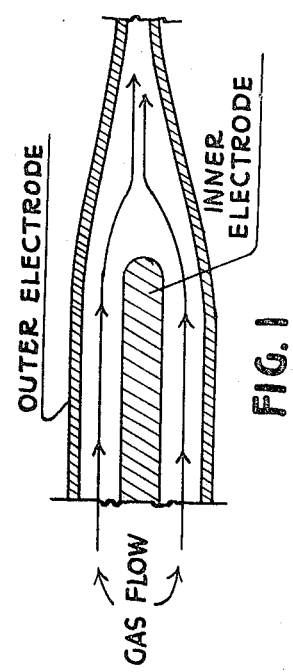
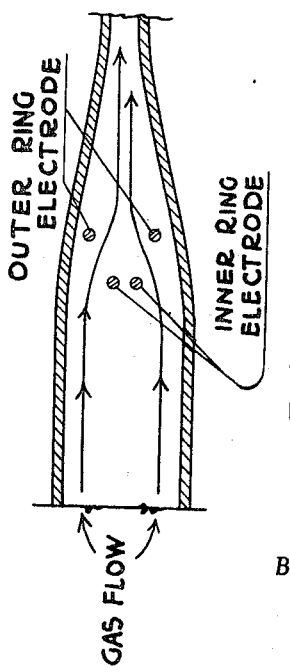

PROCESS FOR PREPARING PIGMENTARY METAL OXIDE

This invention relates to the production of metal oxides, notably pigmentary white metal oxides. More specifically, this invention involves the production of metal oxides, particularly pigmentary titanium dioxide by a vapor phase oxidation process. Although the invention is hereinafter described mainly by reference to specific details of its utilization in connection with the production of pigmentary titanium oxide, it is to be understood that the scope of the invention is not limited to such details.

In the production of metal oxides by vapor phase oxidation of one or more metal halides either in the presence or absence of a fluid bed, a metal halide is oxidized by reaction in the vapor phase state with oxygen or an oxygen-containing gas in a relatively confined area maintained at a temperature at which the halide and oxygen react. Where the reactants are, for example, $TiCl_4$ and $O_2$, the temperature of reaction is above 500° C., preferably 900° to 1,500° C.

Although the reaction of $TiCl_4$ and $O_2$ is highly exothermic, the evolved heat is inherently carried away from the reaction zone by the $TiO_2$ product stream or lost through the reactor walls and therefore, it is necessary to add large quantities of heat both to initiate the reaction and to sustain it.

In the practice of this invention, heat is electrically supplied to the reaction of a metal halide and an oxygenating agent by means of an electric arc. Hereinafter, the term plasma arc will be employed as a synonym for electric arc In accordance with this invention, the production of pigmentary white metal oxide pigments, e.g., titanium oxide, by the vapor phase oxidation of metal halide is accomplished efficiently by generating and adding nucleation agents for such oxidation from one or more electrodes of a plasma arc. Thus, at least one of the plasma arc electrodes contains a metal which may be gradually introduced into the gas atmosphere and which forms a white metal oxide upon oxidation to serve as the nucleating agent or source thereof. Such electrode material is dispersed into the gas passing into the arc by gradual but tolerably slow deterioration and vaporization of the electrode.

In this invention one or more of the electrodes may be made out of any metal which forms a white oxide. The term metal as employed herein is defined as including these elements exhibiting metallike properties including the metalloids.

Examples, not by way of limitation but by way of illustration, of such metals which form a white oxide are aluminum, arsenic, barium, beryllium, boron, calcium, gadolinium, germanium, hafnium, lanthanum, lithium, magnesium, phosphorus, potassium, samarium, scandium, silicon, sodium, strontium, tantalum, tellurium, terbium, thorium, thulium, tin, titanium, yttrium, ytterbium, zinc, zirconium, niobium, gallium, antimony.

Some of the metals are too soft and have insufficient structural strength, particularly at elevated temperatures, to be employed as an electrode, as for example silicon, in which case an appropriate compound of the metal may be employed, e.g., silicon carbide. Other carbides which may be employed are $Al_4C_3$, TiC, ZrC. Likewise, various alloys of the metals may be employed if necessary to obtain added strength.

If two different nucleating agents are to be added to the reaction zone, then it is possible to construct the anode and cathode out of different metals, for example, aluminum and silicon, zirconium and silicon, hafnium and silicon, alumina and potassium, alumina and sodium, magnesium and boron, zinc and silicon, magnesium and antimony, zirconium and thorium, aluminum and thorium, titanium and aluminum, titanium and silicon, and titanium and zirconium. However, as noted above, the silicon should preferably be in the form of silicon carbide (SiC).

In the production of $TiO_2$ and other metal oxides by vapor phase oxidation, the nucleating metal particles from the electrode are added to the reaction zone to aid in the formation of pigmentary metal oxide product. The nucleating particles are added to either one or more of the reactants or to another gas stream, e.g., an inert gas, before introduction to the reaction zone or such particles are introduced directly into the reaction zone independently of any gas stream. Such nucleating agents, not by way of limitation include the oxides and/or salts of metals which form white metal oxides upon oxidation, for example, the metals hereinbefore listed. Examples of such salts are carbides, halides, and carbonates. Furthermore, the pure metal emitted from the electrodes can be added as a nucleating agent.

In the generation of a plasma or electric arc, two or more electrodes are separated by a gap through which a gas flows and across which the arc current passes. Although many design variations and geometric arrangements are feasible, this invention will be described with reference to an arrangement comprising two cylindrical electrodes separated by an annular gap.

In the simplest arrangement, there is provided a cylindrical coaxial configuration consisting of a central inner electrode and a surrounding concentric outer electrode. Such an arrangement is disclosed in FIG. 1.

In another arrangement, illustrated in FIG. 2, the electrodes comprise two concentric rings separated by an annular gap. This is known as the toroidal figuration. For other variations of this particular configuration, reference is made to U.S. Letters Pat. Nos. 2,939,048 and 2,939,049.

In each of the arrangements disclosed in FIGS. 1 and 2, either electrode may serve as the anode or cathode by merely reversing the polarity. Although both figures show the gas flow chamber as comprising a converging duct to accelerate the gas flow, it is also possible to provide a chamber without a converging duct.

Although only two general electrode arrangements have been disclosed in FIGS. 1 and 2, it is to be understood that other arrangements are within the skill of an expert in the art and within the intended scope of this invention. For example, see U.S. Letters Pat. No. 2,916,534.

In the operation of the plasma arc generator, an AC or DC voltage difference or potential is established between the electrodes while a gas flows through the electrodes' gap. The voltage drop may be established by any conventional means. Such means are well known in the electric arc art and also in the electrostatic precipitator art.

Once a voltage difference exists, an electric current will flow between the two electrodes, the magnitude of the current being dependent upon the magnitude of the voltage difference, the nature of the gas, the gas pressure and temperature, and the distance between the electrodes.

The shape of the electrodes is also a controlling factor. Thus, the current flow between a short point and a flat plate is greater than a current flow between two flat plates assuming all other conditions equal.

When there is only a small magnitude of current flow, it is known as a "dark" current or discharge.

If the voltage differential is sufficiently increased, the current will also increase to a faster ion movement brought about by increasing electric field. At a certain potential depending upon the other controlling factors enumerated above, there will be a sudden breakdown of the voltage and a resulting high current arc discharged in the electrodes characterized by extremely high gas temperature, in the order of thousands of degrees. Such discharges are commonly known as corona, glow, electrodeless, or ozonizer. The gas which has been exposed to and activated by the corona discharge is referred to as a plasma.

There will be an increase of energy in the gas which will be based not only on the thermic energy of the gas, but also on molecular disassociation, that is, a certain percentage of the molecules of the gas will be ionized and disassociated by passage through the arc. This disassociation of the molecules will require energy input which will not be reflected in the immediate thermal energy of the gas. However, when the gas stream is subsequently cooled and the molecules recombined, the corresponding disassociation energy is freed and is then reflected in the kinetic energy of the gas stream.

By way of illustration and not by way of limitation, reference is made to FIG. 3 wherein particular plasma arc apparatus is disclosed for the heating of an oxygen gas stream.

Referring to FIG. 3, there is shown an upper electrode 1 in the form of a cylinder surrounded by a water-cooling jacket 2 through which water or any suitable cooling medium may be circulated by any convenient and conventional means. The water inlet and outlet for the jacket are not illustrated. Surrounding the electrode cooling jacket 2 is a magnetic field coil 3 which serves to stabilize the upper end of the arc at electrode 1 and extend the life of electrode 1 by keeping the upper termination of the arc moving by means of the rotational vector of the magnetic field. Although the field and current are preferably set at about 400 amps. and 20 to 30 volts in order to stabilize the arc, this variable has little effect on the ultimate feeding operation of the system. Magnetic field means for preventing rapid deterioration are disclosed in U.S. Letters Pat. No. 2,768,947.

There is also shown a lower electrode 8 in the shape of a cylinder surrounded by cooling jacket 7. Insulation means 9 is provided at each respective end of the electrode cylinder 8. Oxygen or an oxygen containing gas (e.g., air) is fed at inlet 6 tangentially to the inner wall of cylindrical casement or swirl chamber 5 which is so located between the lower portion of electrode 1 and the upper portion of electrode 8. Casement 5 is insulated from electrode 1 by insulation 4 and from electrode 8 by insulation 9.

The oxygen gas passes downwardly through the electrodes arc which is represented by the broken line A wherein it is heated to an appropriate temperature. The bottom electrode 8 is connected to, but electrically insulated from, an assembly of concentric tubes or cylinders 10, 13, and 15 which provides for the introduction of inert gases, metal halides, and oxygen into a vapor phase reaction zone. The innermost cylinder 10 is heat insulated by means of refractory 11 from the concentric tube 13.

After the oxygen gas is heated by means of the electric arc A, the gas passes downwardly into burner assembly 10 wherein it is mixed and cooled with cooler secondary oxygen introduced at nozzle means 12, the secondary oxygen being of a sufficient temperature and quantity to give an overall average temperature in excess of about 1,900° C. (rarely above 2,500° C.) for the resulting mixture of the two oxygen streams. The oxygen stream then passes out of the burner tube 10 into the $TiO_2$ vapor phase oxidation reactor chamber 17, the oxygen stream being externally surrounded by a concentric chlorine stream or shroud emitted from tube 13. The chlorine stream is in turn externally surrounded by a concentric stream of $TiCl_4$ emitted from concentric burner tube 15. Nozzle 16 is provided for introducing the $TiCl_4$ into the upper portion of concentric tube 15. Nozzle 14 is provided for introducing the chlorine into the upper portion of tube 13.

In the operation of the foregoing apparatus and process, the hot gas stream from the plasma may cause thermal deterioration and breakdown of the ceramic burner tube 10. Likewise, the nucleating particles in the stream may cause frictional breakdown of the wall. In such case, the apparatus in FIG. 3 should be so constructed and used as to minimize contact between the exceedingly hot gas stream emerging from the plasma arc and any wall, e.g., the wall of cylinder 10; that is, the gas stream should be restricted to the central portion of cylinder 10. One way of accomplishing this is by the widening of the passage 10, that is, by increasing the internal diameter of tube 10 such that the gas stream remains substantially in the center thereof with little or no contact with the cylinder wall. Such an embodiment also enables the gas stream to cool substantially by natural radiation and thereby enables any gas molecules which do contact the wall to be cooled. Another alternative is to employ a cool inert gas stream, e.g., nitrogen or another gas stream, e.g., oxygen, which is flowed over the internal surface of the burner tube 10 thereby serving as an insulator in between the wall surface and the hot gas stream from the plasma arc. The cooling gas stream may be either parallel or counterflow to the hot gas stream passing through the center of tube 10, parallel flow being the preferred embodiment, or the cooling gas stream may be introduced tangentially to the internal surface of the tube 10 in a direction substantially transverse to the flow of the hot gas stream such that the cooling gas stream spirals over the internal surface of the tube 10.

Another alternative is to cool the hot gas stream promptly by introducing the secondary cooling gas more quickly. e.g., by reducing the length of the tube 10 between the lower portion of electrode 8 and the secondary gas inlet means 12.

Another technique is where the apparatus is constructed in a fashion which permits the walls in contact with the hot gases to be kept relatively cool and at temperatures at which the materials of construction will tolerate. For example, the ceramic material 11 can be internally cooled, e.g., by air or water, to provide and maintain the internal surface of cylinder 10 at a temperature not subject to attack by the gas stream.

It is to be understood that the foregoing apparatus is merely one way of practicing the invention and that other plasma arc apparatus, such as illustrated in FIGS. 1 and 2, may be employed.

Although FIG. 3 illustrates the use of one tangential gas inlet 6, it is also possible to employ a series of tangential inlets such as is shown in U.S. Letters Pat. No. 2,819,428. Also see U.S. Letters Pat. Nos. 1,443,091 and 2,769,079.

The practice of this invention has hereinbefore been described and illustrated in conjunction with the burner depicted in FIG. 3. However, it is useful when other burners are employed, including the type burner illustrated in FIG. 1 or 2 of U.S. Letters Pat. No. 3,068,113 or FIG. 4 of copending U.S. application, Ser. No. 255,453, now abandoned. Thus, where one reactant is first preheated partly or wholly by passage through the electric arc and then is to be introduced into the reactor separately from the other reactant, the burner design of FIG. 3 or U.S. Letters Pat. No. 3,068,113 enables each reactant to be introduced in separate but concentric streams.

It is preferred that the center stream from such burner be the stream initially passed through the arc. The center reactant stream, preferably a stream containing oxygen which has been preheated by and contains nucleating particles from the plasma arc, is introduced at a linear velocity substantially higher than that of the other reactant stream such that the higher velocity center stream serves to suck and merge the lower velocity external stream into it thereby achieving instantaneous and intimate mixing of the two reactant streams and the nucleating particles as they contact the reaction zone. By introducing an inert gas stream, such as chlorine, internally concentric to one reactant and externally concentric to the other, premature reaction near the burner outlets is prevented.

When the reactant passed through the electric arc is oxygen, the nucleating agent supplied from the electrode material and introduced into the stream will be present in the stream as a white metal oxide of the electrode metal. In all probability, the metal from the electrode is promptly oxidized upon its contact with the hot oxygen stream. If the material is silicon carbide or other metal salt, the carbide oxidizes and forms silicon oxide and carbon dioxide. The metal oxide and carbon dioxide are carried by the oxygen stream directly into the zone of reaction, the metal oxide therein nucleating the reaction of the metal halide and oxygen.

In one embodiment hereof, a small amount of metal halide, e.g., titanium tetrachloride, is included in the oxygen stream projecting to the plasma arc. This provides a source of nucleating agents with which to augment the nucleating agents generated from the electrodes. It may also be utilized to provide chemically different nucleating agents, one such as aluminum oxide being supplied from the electrode and the other such as silicon oxide from the metal halide (silicon tetrachloride) included in the oxygen feed to the arc.

When a metal halide, e.g., titanium tetrahalide, is heated in the absence of oxygen by passage through the plasma arc, the electrode metal nucleating material emitted and introduced into the stream is not immediately oxidized to a white metal oxide until it contacts oxygen usually within the zone of reaction inside the reactor.

The inert gas stream may also be preheated by passage through the plasma arc in which case a substantial amount of the electrode metal picked up and carried by the inert stream begins to oxidize, instantaneously after ejection from the burner because of the close proximity of the oxygen and inert gas streams.

The term inert gas as employed herein refers to any gas which is inert to the reaction of the metal halide and oxygen. Examples of such inert gases are argon, nitrogen, helium, krypton, xenon, chlorine and carbon dioxide. It is to be understood that any one of these inert gases, or a mixture of them, may be heated by passage through the electric arc.

Where the gas is inert not only to the reactants of halide and oxygen, but inert as to the electrode as well, then metal from the electrode to provide for the nucleation effect is emitted into the inert gas stream by vaporization and friction of gas stream molecules. However, where the gas is not inert with respect to the metal electrode, then a reaction will take place between the electrode and the gas either before and/or after the metal particles are emitted into the gas stream.

If the inert gas stream is being heated, it is also possible to simultaneously preheat the reactant streams either by a separate electric arc process or by conventional means. If the reactants are to be premixed and added to the reactor in one stream, the temperature of the stream of the reactants should be maintained below about 400° C. in order to prevent premature reaction and encrustation of the burner tube through which the reactants are introduced.

Thus, in one embodiment of this invention, the reactants (e.g., titanium tetrahalide and oxygen) are premixed and introduced into the reactor at a temperature below the reaction temperature. An inert gas (e.g., nitrogen) which has been heated above the reaction temperature by passage through the plasma arc and which has been charged with nucleating electrode particles from one or more electrodes is introduced into the reactor and mixed with the reactants' mixture thereby causing pigmentary metal oxide to be formed.

The inert gas may be mixed with reactants in any of many ways. Thus, it may be introduced into the reaction zone at any desired point. One preferred technique introduces the inert gas stream in a direction which is transverse or perpendicular to the feed direction of the reactants' mixture stream, e.g., where one stream is introduced at the top of the reactor, the other stream is introduced at the side of the reactor transverse to the stream entering at the top.

In the performance of this invention, the reactants and the inert gas stream may be first introduced into the furnace or reactor and then heated by the plasma arc.

The plasma arc may be employed to heat the gas stream subjected thereto to temperatures initially as high as 30,000° C. The exact initial temperatures to which the gas stream should be heated as it passes through the plasma arc will be a function of the overall heat losses in the system. Thus, where titanium tetrachloride and oxygen are being reacted in the vapor phase to produce pigmentary titanium dioxide, sufficient heat energy should be imparted to a gas stream (preferably the oxygen stream), such that this source of heat energy suffices to establish and maintain the reaction by providing in the reaction zone a temperature above 700° C., preferably in the range of 700° to 1,600° C., taking into consideration the amount and thermal energy of the secondary oxygen which is introduced at inlet means 12.

Where the oxygen is being heated in apparatus illustrated in FIG. 3 to an initial temperature of 1,600° to 30,000° C. the quantity of secondary oxygen added at inlet means 12 ranges from 0 to 35 times that of the primary oxygen subjected to the plasma arc on a gram-mole basis.

Regardless of which gas stream is subjected to the plasma arc, the amount of oxygen employed in the process should be in excess of stoichiometric proportions in order to obtain pigmentary metal oxide. The oxygen should be added in an amount ranging from 1 to 25 mole percent based on the metal halide reactant.

In the preferred embodiment of this invention, the reactor pressure ranges from 10 to 150 pounds per square inch absolute. The primary gas stream subjected to the plasma arc is introduced at an absolute pressure ranging from 25 to 400 pounds per square inch. The secondary gas stream introduced downstream of the arc, e.g., at inlet 12 in FIG. 3, is introduced at the reactor pressure or slightly above. The pressure drop through the plasma arc, e.g., from inlet 6 to the lowermost end of electrode 8 in FIG. 3, ranges from 1 to 25 pounds per square inch. The pressure drop through the burner to the reaction zone ranges from 1 to 10 pounds per square inch.

The voltage requirements for the plasma arc electrodes will generally increase with an increase in gas flow, the exact voltage per volume of gas flow being a function of the overall configuration of the system. In the configuration disclosed in FIG. 3, the voltage requirements may range from 250 to 2,500 volts. The current requirements will range from 20 to 200 amps., preferably 80 to 110 amps., but will vary as the power demands change, in accordance with enthalpy desired to be introduced into the gas stream.

The metal particles are emitted into the gas stream in an amount of about 0.1 to about 20 mole percent based on the metal halide, e.g., $TiCl_4$, undergoing reaction. If the particles are being emitted into an oxygen stream, such that a white metal oxide is instantaneously formed, then the white metal oxide particles should be subsequently introduced into the metal halide reactant stream before the average white metal oxide particle size has increased beyond 0.15 micron in diameter.

Various methods are employed to control the rate at which the source of nucleating agent (e.g., the metal particles) is emitted from the electrode into the gas stream. This may be done by magnetic coils and cooling means as illustrated in FIG. 3. However, other methods by which the generation of a nucleating agent from electrode vaporization and consumption may be utilized are rotating or moving electrodes (U.S. Letters Pat. Nos. 2,638,443 and 2,850,662) and a shielding inert gas stream (U.S. Letters Pat. No. 2,862,099). Also reference is made to U.S. Letters Pat. Nos. 2,834,055; 2,858,411; 2,941,063; 2,973,426; Reissue 25,088.

In the further practice of this invention, it is also desirable to add various aromatic organic compounds to the process as set forth in copending U.S. application Ser. No. 844,077, now U.S. Pat. No. 3,586,358 and U.S. Letters Pat. No. 2,968,529 issued to Wilson. Likewise, sulfur or sulfur-containing compounds could be added to the oxygen stream as mentioned in copending U.S. application Ser. No. 15,300.

If the invention is practiced by passing an oxygen stream through the plasma arc, activated oxygen will inherently be produced. Activated oxygen is defined as oxygen in a dissociated state or atomic form. Such oxygen is also obtained by the liberation in the nascent state from a compound containing an oxygen atom in loose or relatively unstable combination. Examples of such compounds are ozone, oxides, and peroxides.

In either case, the activated oxygen has a relatively short life or existence before it recombines to form molecular oxygen. Accordingly, it is important to bring the activated oxygen into the presence of the metal halides rather promptly before recombination of the activated oxygen takes place. The advantages and benefits of employing activated oxygen in a metal oxide process are defined along with other particulars in copending U.S. application Ser. No. 39,439, now U.S. Letters Pat. No. 3,147,077, issued Sept. 1, 1964.

All of the above embodiments have been discussed and disclosed with reference to the use of a plasma generator comprising electrodes. It is also possible to employ radiofrequency or induction feeding as a means of adding energy to the various gas streams; however, such heating method cannot be employed as a nucleating source, since such methods do not comprise electrodes.

The aforementioned plasma arc pigmentary metal oxide process is advantageous not only in being an economical means of heating but likewise in terms of materials handling. Thus, in the conventional vapor phase oxidation processes for producing pigmentary metal oxide, heat is supplied by the combustion of carbon monoxide and the oxygen, thereby resulting in the dilution of the product stream with carbon dioxide. In the aforementioned process, this dilution problem is overcome and the product stream after a reactor retention time above 10 seconds comprises pigmentary $TiO_2$, chlorine, and some unreacted $TiCl_4$. After removal of the titanium dioxide, e.g., by a bag filter or cyclone separator, the chlorine gas and $TiCl_4$ are sent directly to a chlorinator in which rutile ore is being chlorinated to $TiCl_4$ for use in the vapor phase oxidation process for producing pigmentary $TiO_2$. In other words, the gaseous components of the product stream can be recycled without distillation directly to the chlorinator system used to supply $TiCl_4$ with the vapor phase oxidation process.

In a further embodiment of this invention, apparatus as illustrated in FIG. 3 is utilized in conjunction with a third electrode (not illustrated) preferably located downstream of the electrode 8. The electrodes 1 and 8 are constructed out of a metal which does not form a white oxide, e.g., copper, graphite, silver alloy, whereas the downstream electrode is constructed out of a white oxide forming metal. The auxiliary electrode is of a small diameter, 0.01 to 0.50 inches, with a current range of 25 to 125 amps. such that a controllable rate of aluminum vapor, 340 grams to 2,724 grams per hour, can be released to the heated oxygen stream.

The auxiliary electrode may be located at any preferred point in the process, e.g., upstream of the main electrodes, particularly where the configuration of FIGS. 1 or 2 is utilized. Furthermore, the electrode can be located directly in the burner tube 10 downstream of the secondary oxygen inlet 12 or directly within the main reactor downstream of the burner.

A further method of introducing a nucleating agent to a plasma arc process is by introducing a gas or powder directly into the plasma arc in combination with or independent of the gas stream being subjected to the arc. Apparatus by which this may be accomplished is illustrated in FIG. 4 of U.S. Letters Pat. No. 2,858,411.

The following are typical examples:

EXAMPLE I

In a $TiO_2$ vapor phase oxidation process utilizing apparatus as illustrated in FIG. 3, an arc is struck between the electrodes 1 and 8, the requirements of the arc being 94 amps. and 670 volts. Electrode 1 is constructed out of copper and electrode 8 out of aluminum.

Oxygen at about 20° C. is then tangentially introduced into the swirl chamber at inlet 6 at 75 pounds per square inch absolute pressure and a rate of 24 gram-moles per minute. Metallic aluminum particles are emitted from electrode 8 at the rate of 23 grams per minute into the $O_2$ stream and are immediately converted to $Al_2O_3$. The calculated temperature of the oxygen stream immediately after its passage through the arc is about 2,650° C. which is equivalent to an enthalpy of about 1,750 B.t.u. per pound of oxygen. The calculation is based on a 75 percent efficiency for conversion of the power input to the electrodes to energy transmitted to the oxygen stream.

The heated oxygen stream is then mixed with a secondary supply of oxygen introduced through inlet nozzle 12 at about 20° C. and 17 pounds per square inch absolute pressure and at the rate of about 13.2 gram-moles per minute at 20° C. The resulting temperature of the two oxygen streams after mixing is calculated at about 2,150° C. or an enthalpy of 1,100 B.t.u. per pound of oxygen.

The resulting oxygen mixture is then fed as a continuous stream into reactor chamber 17. Simultaneously there is introduced 32 gram-moles per minute of $TiCl_4$ at 140° C. through tube 15 and 5 gram-moles per minute of chlorine at 150° C. through tube 13 to provide a chlorine shroud between the oxygen and the $TiCl_4$ streams. The total oxygen is thus added at 16 mole percent excess based on the amount theoretically required to convert $TiCl_4$ to $TiO_2$. Liquid $SiCl_4$ is added to the $TiCl_4$ stream before its introduction to the reactor in an amount sufficient to promote the formation of pigmentary pigment, about 0.18 gram-moles per minute.

The oxygen and $TiCl_4$ streams merge and react at a point within the reactor removed from the concentric burner tubes due to the chlorine shroud. A thermocouple located in the upper portion of the reaction zone measures the therein prevailing temperature as 1,160° C. The absolute pressure in the reactor is 16 pounds per square inch.

After an average reactor retention time of approximately 10 to 15 seconds, the pigmentary $TiO_2$ product is withdrawn at the bottom of the reactor. A typical analysis for a product sample during an 8 hour run is represented in Table I.

TABLE I

| | |
|---|---|
| Tinting strength | 1660 (Reynolds scale) |
| Rutile content | 99.0 percent |
| $SiO_2$ in product | 0.41 percent by weight |
| $Al_2O_3$ in product | 1.70 percent by weight |

EXAMPLE II

In a vapor phase oxidation process utilizing the apparatus of FIG. 3, an arc is struck between electrodes 1 and 8, the requirements of the arc being 98 amps. and 1,000 volts. Both electrodes are constructed out of copper.

Oxygen at about 30° C. is then tangentially introduced at about 20° C. and 100 pounds per square inch absolute pressure at a rate of 34.9 gram-moles per minute. The calculated temperature of the oxygen stream immediately after its passage through the arc is 2,650° C. equivalent to an enthalpy of about 1,750 B.t.u. per pound of oxygen.

The heated oxygen stream is then mixed with secondary oxygen introduced through inlet nozzle 12 at 20° C. and 20 pounds per square inch absolute pressure and at the rate of 4.1 gram-moles per minute. The resulting temperature of the two oxygen streams after mixing is calculated at about 2,480° C. or an enthalpy of about 1,500 B.t.u. per pound of oxygen.

The resulting mixture is then fed as a continuous stream into reactor chamber 17. Simultaneously there is introduced 32 gram-moles per minute of $TiCl_4$ at 120° C. through tube 15 and 6 gram-moles per minute of chlorine at 150° C. through tube 13 thereby providing a chlorine shroud between the concentric oxygen and $TiCl_4$ streams. The total oxygen is thus added at about 22 mole percent excess based on the amount theoretically required to convert $TiCl_4$ to $TiO_2$. Liquid $SiCl_4$ is added to the $TiCl_4$ stream at the rate of 0.20 gram-moles per minute prior to the introduction of the $TiCl_4$ into the reactor. Vaporous $AlCl_3$ is added to the upper portion of reactor chamber 17 near the burner at the rate of 0.80 gram-moles per minute.

The $O_2$ and $TiCl_4$ streams merge and react at a point within the reactor removed from the concentric burner tubes. A thermocouple located in the upper portion of the reaction zone measures the therein prevailing temperature at 1,300° C. The absolute pressure in the reactor is 16 pounds per square inch.

After an average reactor retention time of approximately 10 to 12 seconds, the pigmentary $TiO_2$ product is withdrawn at the bottom of the reactor. A typical analysis for a product sample is represented in Table II.

TABLE II

| | |
|---|---|
| Tinting strength | 1720 (Reynolds scale) |
| Rutile content | 99.2 percent |
| $SiO_2$ in product | 0.47 percent by weight |
| $Al_2O_3$ | 1.60 percent by weight |

EXAMPLE III

In a TiO₂ vapor phase oxidation process utilizing the apparatus illustrated in FIG. 3, an arc is struck between electrodes 1 and 8, the requirements of the arc being 95 amps. and 990 volts. Electrodes 1 and 8 are both constructed out of copper.

Oxygen at about 20° C. is tangentially introduced into the swirl chamber through inlet 6 at 60 pounds per square inch absolute pressure and a rate of 30 gram-moles per minute. The calculated temperature of the oxygen stream immediately after its passage through the arc is about 2,650° C. which is equivalent to an enthalpy of 1,750 B.t.u. per pound of oxygen.

The heated oxygen stream is then mixed with a secondary supply of oxygen introduced through inlet nozzle 12 at about 20° C. and 18 pounds per square inch absolute pressure and at the rate of 8 gram-moles per minute. The resulting temperature of the two oxygen streams after mixing is calculated at about 2,350° C.

The resulting oxygen mixture is then brought into continuous contact with an auxiliary electrode inserted into the lower portion of burner tube 10 below nozzle 12. The electrode is 0.035 inches in diameter, constructed out of pure aluminum, and is supplied with a current of 75 amps. such that 25 grams per minute of aluminum vapor are released from the electrode at a continuous rate into the oxygen stream, the aluminum being immediately oxidized to Al₂O₃.

The oxygen mixture containing Al₂O₃ is then continuously fed into reactor chamber 17 while simultaneously there is introduced 32 gram-moles per minute of TiCl₄ at 170° C. through tube 15 and 5 gram-moles per minute of chlorine at 170° C. through tube 14 thereby providing a chlorine shroud between the oxygen and TiCl₄ stream. The total oxygen is thus added at about 19 mole percent excess based on the amount of oxygen required theoretically to convert TiCl₄ to TiO₂. Liquid SiCl₄ is added at a rate of 0.19 gram-moles per minute to the TiCl₄ stream before the TiCl₄ is fed to the reactor.

The O₂ and TiCl₄ stream merge and react within the reactor chamber 17 at a point remote from the burner. A thermocouple in the upper portion of the reaction zone measures the therein prevailing temperature at 1,250° C. The absolute pressure in the reactor is 16 pounds per square inch.

After an average retention time in the reactor above 10 seconds, the pigmentary TiO₂ product is withdrawn from the reactor. A typical analysis is represented in Table III.

TABLE III

| | |
|---|---|
| Tinting strength | 1700 (Reynolds scale) |
| Rutile content | 99.0 percent |
| SiO₂ in product | 0.43 percent by weight |
| Al₂O₃ | 1.85 percent by weight |

It is to be understood that any of the above teachings may be employed in any vapor phase oxidation process for providing a pigmentary metal oxide either in the absence or presence of a fluidized bed.

Although this invention has been described with particular reference to the production of pigmentary TiO₂, it is equally applicable to the production of other metal oxides, particularly the white oxides of those metals hereinbefore disclosed, more particularly SiO₂.

The above description of the invention has been given for purposes of illustration and not limitation. Various changes and modifications which fall within the spirit of the invention and scope of the appended claims will become apparent to the skilled expert in the art. Thus, it will be understood that the invention is in no way to be limited except as set forth in the following claims.

We claim:

1. In a process of preparing finely divided pigmentary metal oxide by vapor phase oxidation of a metal halide with an oxygen-containing gas in a reaction zone at elevated temperatures, the improvement which comprises generating a gaseous plasma by passing a gaseous stream through a discharge of electrical energy intense enough to heat said gaseous stream to from 1,600° to 30,000° C., said discharge being conducted between electrodes, providing in the path of said gaseous plasma a further electrode containing a white oxide forming metallic element, controllably generating from such further electrode under the conditions of said electrical discharge particles comprising said metallic element, and forwarding said gaseous stream to said reaction zone whereby to carry particles comprising said metallic element into said reaction zone for nucleation of said oxidation reaction.

2. A process according to claim 1 wherein the pigmentary metal oxide is titanium dioxide and the metal halide is titanium tetrachloride.

3. A process according to claim 1 wherein said further electrode is comprised of a member selected from the group consisting of metal and metal compounds of aluminum, silicon, zirconium, potassium, sodium and titanium.

4. A process according to claim 1 wherein from 0.1 to 20 mole percent, based on titanium tetrachloride, of particles comprising said metallic element are generated.

5. A process according to claim 2 wherein said white oxide forming metallic element is aluminum.

6. In a process of preparing finely divided pigmentary titanium dioxide by vapor phase oxidation of titanium tetrahalide with an oxygen-containing gas in a reaction zone at temperatures above 500° C., the improvement which comprises heating at least a portion of the oxygen-containing gas to from 1,600° to 30,000° C. by passing such portion through a discharge of electrical energy conducted between electrodes, providing in the path of said oxygen-containing gas a further electrode containing a white oxide forming metallic element, controllably generating from such further electrode under the conditions of said electrical discharge particles comprising said metallic element, forming white metal oxide from said particles and said oxygen-containing gas, and forwarding said oxygen-containing gas to said reaction zone whereby to carry said white oxide into said reaction zone for nucleation of said oxidation reaction.

7. A process according to claim 6 wherein the titanium tetrahalide is titanium tetrachloride.

8. A process according to claim 6 wherein said white oxide forming metallic element is aluminum.

9. A process according to claim 6 wherein from 0.1 to 20 mole percent, based on titanium tetrahalide, of said white oxide forming metallic element is generated.

10. In a process of preparing finely divided pigmentary titanium dioxide by vapor phase oxidation of titanium tetrachloride with an oxygen-containing gas in a reaction zone at temperatures above 500° C., the improvement which comprises generating a gaseous plasma by heating at least a portion of said oxygen-containing gas to from 1,600° to 30,000° C. by passage through an electric arc discharge conducted between electrodes, providing in the path of said oxygen-containing gas a further electrode containing a white oxide forming metallic element, controllably generating from such further electrode particles comprising said metallic element by supplying current to such electrode, forming white metal oxide from said particles and said oxygen-containing gas, and forwarding said oxygen-containing gas to said reaction zone whereby to carry said white oxide into said reaction zone for nucleation of said oxidation reaction.

11. In a process of preparing finely divided pigmentary titanium dioxide by vapor phase oxidation of titanium tetrachloride with an oxygen-containing gas in a reaction zone at temperatures above 500° C., the improvement which comprises heating at least a portion of said oxygen-containing gas to from 1,600° to 30,000° C. by passing said gas through an electric arc discharge conducted between two silver alloy electrodes, providing in the path of said oxygen-containing gas a further aluminum electrode, controllably generating from said aluminum electrode under the conditions of said electric discharge from 340 to 2,724 grams of aluminum vapor per hour, forming aluminum oxide from said aluminum vapor and said oxygen-containing gas, and forwarding said oxygen-containing gas to said reaction zone whereby said aluminum oxide is carried into said reaction zone for nucleation of said oxidation reaction.

12. A process according to claim 1, wherein the gaseous plasma is an oxygen-containing gas plasma.

* * * * *